United States Patent
Takama et al.

(10) Patent No.: US 7,032,571 B2
(45) Date of Patent: Apr. 25, 2006

(54) INTERNAL COMBUSTION ENGINE CONTROLLER

(75) Inventors: Yasuyuki Takama, Gotenba (JP); Mamoru Yoshioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/020,119

(22) Filed: Dec. 27, 2004

(65) Prior Publication Data
US 2005/0145217 A1    Jul. 7, 2005

(30) Foreign Application Priority Data
Jan. 5, 2004    (JP) .............................. 2004-000114

(51) Int. Cl.
*F02P 5/00*    (2006.01)
(52) U.S. Cl. ............................ 123/406.23; 123/406.53; 123/406.3
(58) Field of Classification Search ........... 123/406.23, 123/406.24, 406.25, 406.53, 406.54, 406.3, 123/406.31, 406.49, 406.59
See application file for complete search history.

(56) References Cited

U.S. PATENT DOCUMENTS

| | | | | |
|---|---|---|---|---|
| 4,719,794 A | * | 1/1988 | Ruiz | 73/118.1 |
| 5,855,533 A | * | 1/1999 | Tolkacz et al. | 477/110 |

FOREIGN PATENT DOCUMENTS

| | | |
|---|---|---|
| JP | 2001-304084 A | 10/2001 |
| JP | 2002-168168 A | 6/2002 |
| JP | 2002266689 A | 9/2002 |

* cited by examiner

*Primary Examiner*—John T. Kwon
(74) *Attorney, Agent, or Firm*—Oliff & Berridge, PLC

(57) ABSTRACT

From the start of the engine to the detection of an engine speed peak, a control parameter (e.g., ignition timing) different from an air intake rate relating to an engine output is set to a value at which the engine output decreases than at an idling value. After detection of the peak, the control parameter is adjusted to the idling value.

16 Claims, 7 Drawing Sheets

INTERNAL COMBUSTION ENGINE CONTROLLER

BACKGROUND OF THE INVENTION

1. Field of the Invention

The present invention relates to a control technique for internal combustion engines, and more particularly, to a control technique for preventing an engine speed from abruptly increasing to an excessively high speed immediately after the start of the engine.

2. Background Art

Immediately after the start of an internal combustion engine, the engine speed abruptly increases well above an idling speed. This is due to the fact that whereas the internal pressure of the air intake pipe under normal operating conditions including an idling state is a negative pressure, the internal pressure of the air intake pipe during engine start is an atmospheric pressure. During start of the engine, as in an idling state, a throttle valve is closed and an ISC valve is opened to a required idling angle position. Since the air density inside the air intake pipe during the start increases above the air density reached under normal operating conditions, the amount of air taken into a combustion chamber immediately after the engine has been started up increases above the amount of air taken in during idling, even for the same valve angle. Consequently, the output of the engine increases according to the particular increment of the air intake rate, thus causing the engine speed to increase above the idling speed.

The technique described in Japanese Patent Laid-open No. 2001-304084 is known as a conventional technique for preventing an engine speed from abruptly increasing to an excessively high speed. This technique suppresses an increase in engine speed by retarding ignition timing with respect to idling ignition timing, for a required time after the start of the engine, and reducing the engine output.

However, it is difficult to preset the time for retarding the ignition timing, since the rotational behavior of the engine after it has been started changes under the influence of air density, an air/fuel ratio (volatility of the fuel), friction (oil viscosity and a rod-cylinder fit), and other factors. Trouble is likely to arise, depending on the particular relationship between the retarding time of the ignition timing and the rotational behavior after the engine start. For example, if the fuel is heavy in terms of properties and the rate of the abrupt increase of the engine speed is lower than usual, the engine speed is likely to suddenly decrease, thus causing the engine to stall. Conversely, if the fuel is light in terms of properties or friction is low and the rate of the abrupt increase of the engine speed is higher than usual, the abrupt increase of the engine speed may not be sufficiently preventable.

SUMMARY OF THE INVENTION

The present invention has been made for solving the above problems, and an object of the invention is to provide the internal combustion engine controller that is adapted so that without being affected by changes in the rotational behavior of the engine immediately after the start thereof, the engine speed can be prevented from abruptly increasing to an excessively high speed.

In accordance with one aspect of the present invention, the controller comprises a unit for detecting a peak of an engine speed after start of the engine; and a unit for suppressing an increase in engine speed by adjusting a control parameter different from an air intake rate relating to an engine output. From the start of the engine to detection of the speed peak by the speed peak detection unit, the speed increase suppression unit sets the control parameter to a value at which the engine output decreases than at an idling value, and after the detection of the speed peak, adjusts the control parameter to the idling value.

In accordance with another aspect of the present invention, the controller comprises a unit for detecting a peak of an engine speed after start of the engine; and a unit for suppressing an increase in engine speed by adjusting a load of equipment driven by the engine. From the start of the engine to detection of the speed peak by the speed peak detection unit, the speed increase suppression unit increases the load of the equipment to a value greater than an idling load, and after the detection of the speed peak, adjusts the load of the equipment to the idling load.

Other objects and further features of the present invention will be apparent from the following detailed description when read in conjunction with the accompanying drawings.

DESCRIPTION OF THE PREFERRED EMBODIMENT

First Embodiment

Figure 1:
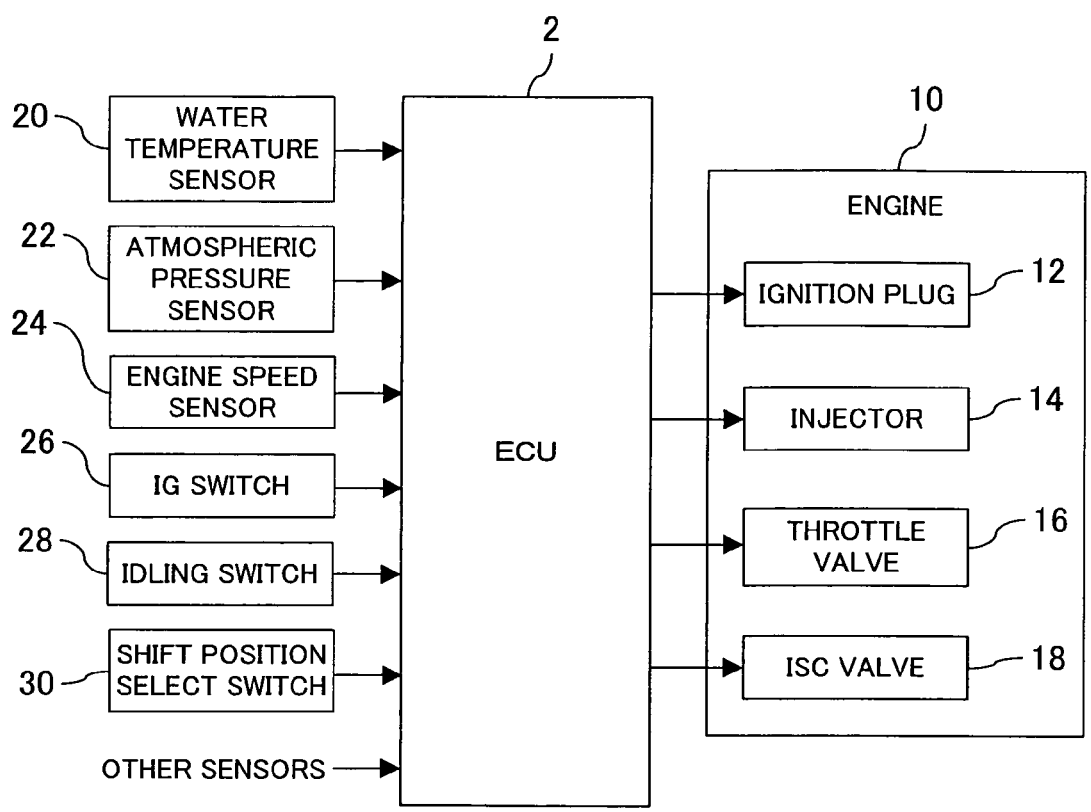
FIG. 1 is a diagram for explaining a configuration of the controller according to a first embodiment of the present invention.

A first embodiment of the present invention is described below with reference to the accompanying drawings.

FIGS. 1 to 5D are diagrams for explaining an internal combustion engine controller according to the first embodiment of the present invention. The controller according to the present embodiment is constructed as an electronic control unit (ECU) 2. In accordance with output signals from a plurality of sensors and switches, the ECU 2 synthetically controls various equipments relating to an operating state of an internal combustion engine 10. In the present embodiment, as shown in a block diagram of FIG. 1, a water temperature sensor 20, an atmospheric pressure sensor 22, an engine speed sensor 24, an ignition switch (IG switch) 26, an idling switch 28, and a shift position select switch 30 are connected to an input end of the ECU 2. Also, ignition plugs 12, an injector 14, a throttle valve 16, and an idling speed control (ISC) valve 18 are connected to an output end of the ECU 2. The ECU 2 receives the output signals supplied from the sensors 20, 22, 24, and the switches 26, 28, 30, and supplies driving signals to the equipments 12, 14, 16, 18. Although other plural sensors, switches, and equipments are also connected to the ECU 2, the description of these elements is omitted herein.

Figure 2:
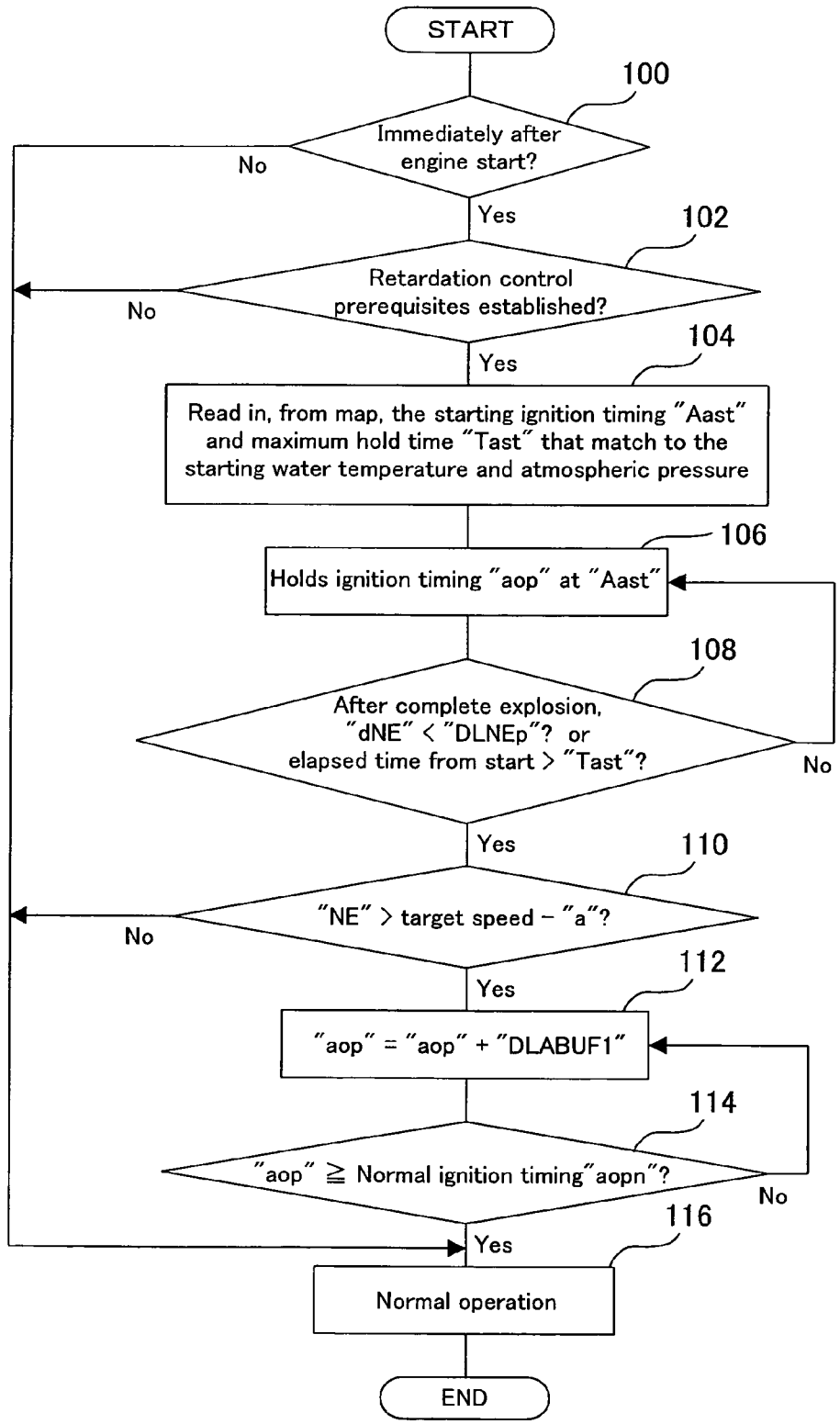
FIG. 2 is a flowchart of the ignition timing retardation control routine executed in the first embodiment of the present invention.

FIG. 2 is a flowchart showing details of the control that the ECU 2 conducts in the present embodiment when the engine 10 is started. During the start of the engine 10, the ECU 2 conducts speed increase suppression to suppress an abrupt increase in engine speed of the engine 10 immediately after the start thereof. The speed increase suppression conducted in the present embodiment is outlined below. During an increasing period of the engine speed up to its arrival at a speed peak, an engine output is suppressed by retarding ignition timing with respect to idling ignition timing. In addition, once the engine speed peak has been reached or exceeded, a decrease in the engine speed is prevented by advancing ignition timing with respect to idling ignition timing.

During the start of the engine 10, the throttle valve 16 is closed and the ISC valve 18 is opened to a required idling valve position. Since an internal air density of an air intake pipe during the start is higher than under normal operating conditions, the amount of air taken into a combustion chamber of the engine 10 immediately after the start is greater than in an idling state, even for the same valve angle position. The engine output increases according to the particular increment of air intake, and the engine speed increases accordingly. Retarding the ignition timing, however, makes it possible to suppress the increase in the engine output, and hence, the increase in the engine speed. In addition, after the engine speed has abruptly increased, although an excessive air intake pipe negative pressure occurs and the engine speed progressively decreases, advancing the ignition timing to the idling ignition timing makes the decrease in the engine output suppressible, thus making the decrease in the engine speed preventable. Hereinafter, the speed increase suppression in the present embodiment is referred to specifically as ignition timing retardation control.

More specifically, ignition timing retardation control by the ECU 2 is conducted using the routine (ignition timing retardation control routine) flowcharted in FIG. 2. First, whether the engine 10 has just been started is judged in step 100. This judgment is based on whether an ignition timing retardation control prohibition flag is set to 1 or 0. After ignition timing retardation control has been started, the flag is set to 1 when ignition timing retardation control comes to an end. After this, the flag is reset to 0 when the engine 10 stops. When the flag is reset, the ECU 2 judges that the engine 10 has just been started.

If, in step 100, the engine 10 is judged not to have just been started, routine control proceeds to step 116, in which step the flag is then set to 1 and ignition timing control based on normal operation is conducted.

If, in step 100, the engine 10 is judged to have just been started, whether two prerequisites for executing ignition timing control are established is judged in step 102. One of the prerequisites, i.e., a first prerequisite is a condition for judging, with a state of the engine 10 taken into consideration, whether the retardation of ignition timing is possible. More specifically, the starting water temperature detected by the water temperature sensor 20 must be within a required range. The water temperature is indicative of a temperature state of the engine 10. If the water temperature is too low or too high, however, it is difficult to obtain normal combustion, so if the starting water temperature is outside the required range, ignition timing retardation control is not executed.

The other prerequisite (second prerequisite) judged in step 102 whether the prerequisite is established is a condition for judging whether a driver has intent to operate the engine 10. If the driver is going to operate the engine 10 (for example, with a view to starting a vehicle or racing the engine), the execution of ignition timing retardation control gives a sense of uneasiness to the driver since the driver's intended engine speed cannot be obtained. Therefore, when the driver's operations of the engine 10 or the driver's preparatory steps for operating the engine 10 are detected, the execution of ignition timing retardation control is prohibited since the driver is regarded as having an intent to operate the engine 10. More specifically, when the idling switch 28 is off and the shift position select switch 30 is placed in a neutral (N) range, the second prerequisite is judged to have been established, and in other cases, the execution of ignition timing retardation control is prohibited. The engine 10 is operated by stepping on an accelerator pedal, and whether the accelerator pedal is being stepped on can be detected by on/off operations on the idling switch 28. If the driver is going to start the vehicle, the driver operates a transmission for a shift from the N range to a driving range, as a preparatory step for operating the engine 10. This transmission operation can be detected from the selection signal sent from the shift position select switch 30.

In regards to judging whether the second prerequisite is established, the driver may step on the accelerator pedal during a time period from activation of the IG switch 26 to the start of the engine 10. In such a case, the driver's operation is most likely to be an erroneous operation not based on the driver's intent of starting the vehicle or of racing the engine. If the execution of ignition timing retardation control is prohibited even in such a case, the prohibition not only makes it impossible to achieve its intended purpose of suppressing an abrupt increase in the engine speed, but also gives the driver a feeling of uneasiness due to a difference from an increase rate of the engine speed reached when ignition timing retardation control is in progress. The ECU 2, therefore, conducts an establishment judgment on the second prerequisite, only after a complete explosion in the engine 10 has been occurred. The judgment of a complete explosion can use a known judgment method. For example, the engine speed detected by the engine speed sensor 24, and a required engine speed during a complete explosion are compared with each other. If the detected engine speed is in excess of the complete-explosion engine speed, the complete explosion is judged to have been occurred.

If, in step 102, either prerequisite is judged not to have been established, routine control proceeds to step 116, in which step the flag is then set to 1 and ignition timing control based on normal operation is conducted.

Figure 3:
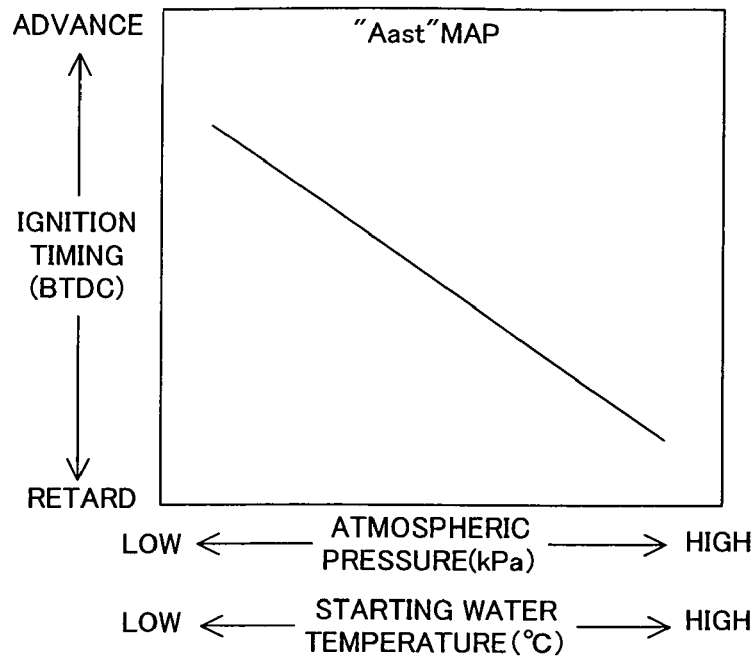
FIG. 3 is a map used for determination of starting ignition timing in the ignition timing retardation control routine.

If, in step 102, both prerequisites are judged to have been established, ignition timing retardation control in step 104 onward is executed. First, starting ignition timing "Aast" is determined in step 104. The starting ignition timing "Aast"

is the ignition timing value set when the engine 10 is started. This value is set to retard the starting ignition timing with respect to normal idling ignition timing "Aopn". The starting ignition timing "Aast" is defined for each of different starting water temperatures or atmospheric pressures, on such a map as shown in FIG. 3. The ECU 2 reads in, from the map, the starting ignition timing "Aast" matching to the water temperature detected by the water temperature sensor 20 and to the atmospheric pressure detected by the atmospheric pressure sensor 22. The atmospheric pressure can also be calculated from the amount of intake air detected by an air flow meter. The map shown in FIG. 3 indicates that the starting ignition timing "Aast" is set to be advanced more significantly as the atmospheric pressure decreases. This allows for a relationship between air density and engine output. Decreases in engine output due to decreases in air density are compensated for by adjustment of ignition timing in terms of its amount of retardation. The map also indicates that the starting ignition timing "Aast" is set to be advanced more significantly as the water temperature decreases. This allows for a friction loss of the engine 10. Decreases in the engine output due to cold-starting friction loss are compensated for by adjustment of ignition timing in terms of its amount of retardation.

Figure 4:
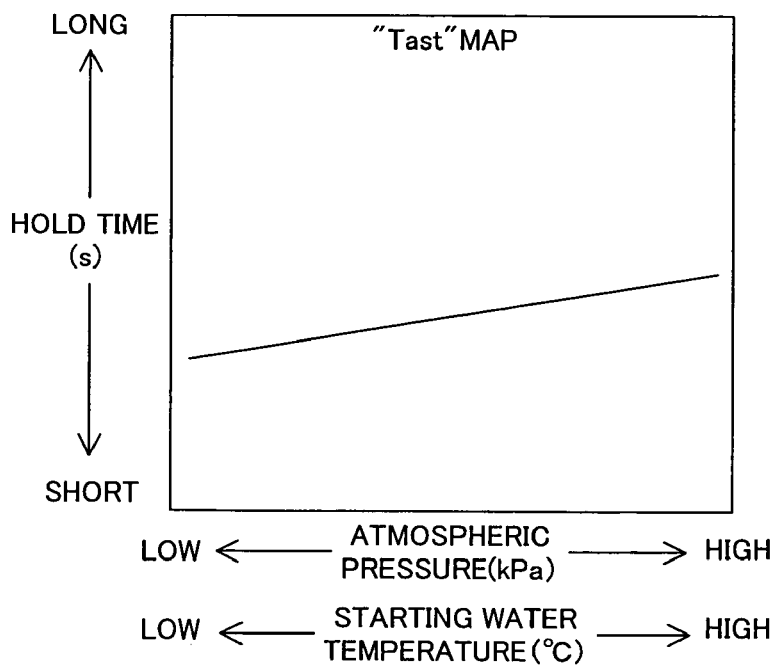
FIG. 4 is a map used for determining a maximum hold time in the ignition timing retardation control routine.
Figure 5A:
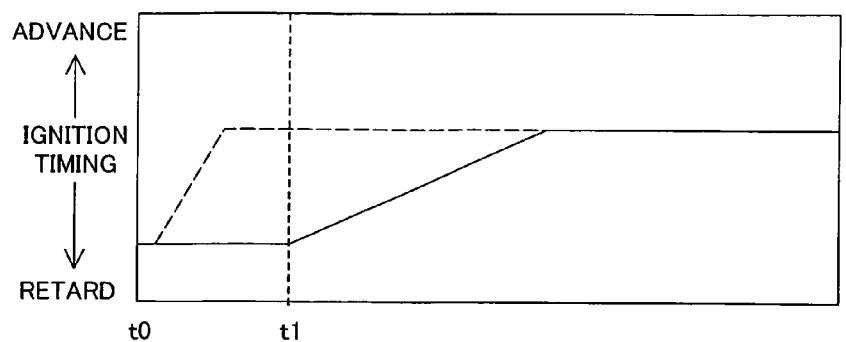
FIG. 5A is a graph in which time-varying changes in ignition timing during execution of the ignition timing retardation control routine are plotted.
Figure 5B:
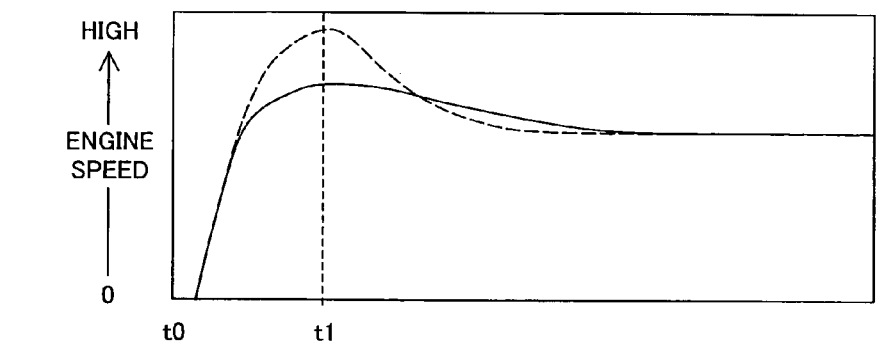
FIG. 5B is a graph in which time-varying changes in engine speed during execution of the ignition timing retardation control routine are plotted.
Figure 5C:
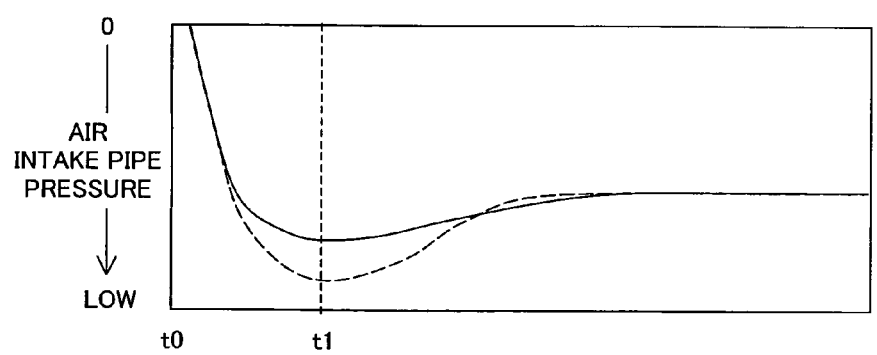
FIG. 5C is a graph in which time-varying changes in air intake pipe pressure during execution of the ignition timing retardation control routine are plotted.
Figure 5D:
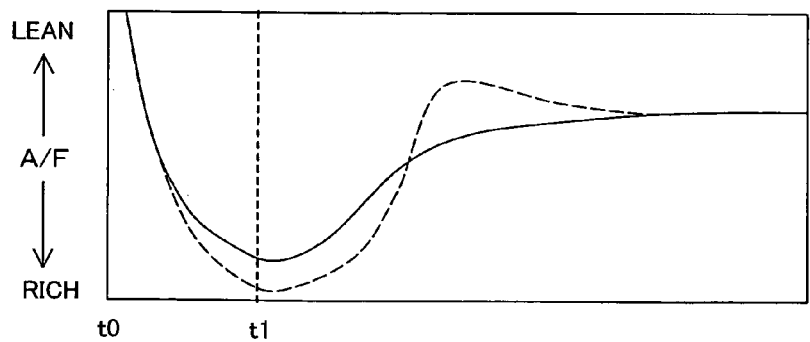
FIG. 5D is a graph in which time-varying changes in air/fuel ratio during execution of the ignition timing retardation control routine are plotted.

Furthermore, in step 104, maximum hold time "Tast" is also determined. The maximum hold time "Tast" defines a maximum time during which ignition timing is to be held at the starting ignition timing "Aast". The ignition timing retardation control according to the present invention holds ignition timing at the starting ignition timing "Aast" until the engine speed has reached a speed peak. However, a speed peak detection failure could occur during the speed peak detection process described later herein. The maximum hold time "Tast" is therefore set so that even if such a failure occurs, the ignition timing retardation control can be terminated without fail. The maximum hold time "Tast" is defined for each of different starting water temperatures or atmospheric pressures, on such a map as shown in FIG. 4. The ECU 2 reads in, from the map, the maximum hold time "Tast" matching to the water temperature detected by the water temperature sensor 20 and to the atmospheric pressure detected by the atmospheric pressure sensor 22. The map shown in FIG. 4 indicates that the maximum hold time "Tast" is set to become shorter as the atmospheric pressure deceases and as the starting water temperature decreases. This allows for the fact that under a relatively low output situation, the time required for the engine speed to reach a speed peak also becomes shorter. The maximum hold time "Tast" is for emergency use only, so "Tast" is set to be sufficiently longer than the time required for the engine speed to reach a speed peak.

In next step 106, ignition timing "aop" of the ignition plugs 12 is set to match the starting ignition timing "Aast" that was determined in step 104. The ignition timing "aop" is held at the starting ignition timing "Aast" until the conditions described in next step 108 have been established. In step 108, it is first judged whether, after a complete explosion in the engine 10, a change rate "dNE" of the engine speed has decreased below a required threshold "DLNEp" (e.g., 5 rpm). After the start of the engine 10, the engine speed abruptly increases and a rate of the increase decreases before too long and eventually reaches zero. It can be judged, therefore, that the time when the change rate "dNE" decreases below the required threshold "DLNEp" is the time when a speed peak is reached. Thus, the ignition timing "aop" is held at the starting ignition timing "Aast" until the peak of the engine speed has been detected. Whether a complete explosion in the engine 10 has been occurred is judged to prevent the speed peak from being erroneously detected if the engine speed suffers a change due to driving of the engine 10 by a starting motor.

In step 108, it is also judged whether an elapsed time from the start of the engine 10 is in excess of the maximum hold time "Tast". This judgment process is performed if, as mentioned above, a speed peak has not been detected. Before the elapsed time from the start exceeds the maximum hold time "Tast", the change rate "ΔNE" usually decreases below the required threshold "DLNEp". When the change rate "dNE" usually decreases below the required threshold "DLNEp" or the elapsed time from the start exceeds the maximum hold time "Tast", the ignition timing "aop" is advanced by execution of processes in the next step 110 onward.

In step 110, it is judged whether an engine speed "NE" is lower than a target idling speed by at least a required value of "a". The engine speed "NE" here refers to the engine speed detected when the conditions were judged to be established in step 108, namely, the engine speed at the speed peak. Usually, the engine speed increases above a target idling speed. For a heavy fuel, however, the engine speed "NE" at the speed peak is unlikely to reach the target idling speed as a result of suppression of an abrupt increase by the processes of steps 106 and 108. In such a case, since the engine 10 is likely to stall, there is a need to advance the ignition timing "aop" as soon as possible. If the engine speed "NE" at the speed peak is in excess of the target idling speed, it is desirable that in order to cause no abrupt changes in output, the ignition timing "aop" be advanced according to a particular decrease in the engine speed existing after it has arrived at a speed peak.

If, in step 110, the engine speed "NE" is judged to be lower than the target idling speed by at least the required value of "a", sequence control proceeds to step 116, in which step the flag is then set to 1 and ignition timing control based on normal operation is conducted. The ignition timing "aop" is thus advanced to normal idling ignition timing "aopn" at a normal advance rate. The advance rate at this time is set to be a critical rate not causing the engine 10 to knock. Also, the normal ignition timing "aopn" is set to be an MBT (Minimum advance for the Best Torque) at which the engine output and a fuel consumption ratio become the best.

If, in step 110, the engine speed "NE" is judged to be in excess of a speed lower than the target idling speed by at least the required value of "a", the ignition timing "aop" is advanced to the normal ignition timing "aopn" by execution of processes in steps 112 and 114. First, in step 112, the value obtained by adding a required amount of advance, "DLA-BUF1", to the current ignition timing "aop" is set as new ignition timing "aop". In step 114, it is judged whether the ignition timing "aop" that was set in step 112 is equal to, or in excess of, the normal ignition timing "aopn". The processes of steps 112 and 114 are repeated until the ignition timing "aop" has equaled or exceeded the normal ignition timing "aopn". Thus, the ignition timing "aop" is gradually advanced from the starting ignition timing "Aast" to the normal ignition timing "aopn". The advance rate at this time is set to a value smaller than obtained under normal operating conditions, namely, the advance rate existing if sequence control proceeds to a "No" route in judgment step 110. In this way, the ignition timing "aop" is advanced at an advance rate lower than a critical advance rate not causing the engine 10 to knock. Ignition timing can therefore be advanced according to a particular increase in air intake pipe pressure, a combustion state stabilizes, and the deterioration of exhaust gas emissions is prevented.

If, in step 114, the ignition timing "aop" is judged to be equal to, or in excess of, the normal ignition timing "aopn", sequence control proceeds to step 116, in which step the flag is then set to 1 and the above-described series of ignition timing control processes are completed. Setting of the flag to 1 is followed by ignition timing retardation control based on normal operation. This prevents ignition timing retardation control from being erroneously executed when the vehicle is subsequently started, and thus prevents hesitation during the start. After this, if the engine 10 comes to a stop due to an turn-off operation on the IG switch 26, an engine stall, idling stop control, or the like, the flag is reset to 0 and the above routine is executed once again for the next engine start.

FIGS. 5A, 5B, 5c and 5D show graphs of the time-varying changes in ignition timing, in engine speed, in air intake pipe pressure, and in air/fuel (A/F) ratio that were observed during execution of ignition timing retardation control based on the routine of FIG. 2. In each graph of FIGS. 5A, 5B, 5c and 5D, a solid line indicates the changes observed during an active state of ignition timing retardation control, and a broken line indicates the changes observed during an inactive state of ignition timing retardation control. In other words, the broken line indicates the changes observed when conventional timing control (hereinafter, referred to as conventional control) is in progress.

As denoted by the broken line in FIGS. 5A, 5B, 5c and 5D, under conventional control, when the engine 10 is started (i.e., at a time of "t0"), ignition timing is immediately advanced from the starting ignition timing "Aast", toward the normal idling ignition timing "aopn". Usually, the advance rate at this time is set a critical rate not causing the engine 10 to knock. When ignition timing retardation control is executed, however, ignition timing is held at the starting ignition timing "Aast", even after the start of the engine 10, as denoted by the solid line. As a result, increases in engine speed during ignition timing retardation control are controlled to small values, compared with those of conventional control. Ignition timing remains held at the starting ignition timing "Aast" until the engine speed has reached a speed peak (i.e., up until a time of "t1"). Thus, the engine speed, without being affected by changes in rotational behavior, is prevented from increasing well above the target idling speed. After arrival at the speed peak, ignition timing is advanced from the starting ignition timing "Aast" toward the normal idling ignition timing "aopn". Since the advance rate at this time is set below the advance rate obtained under conventional control, the engine speed is prevented from increasing once again and gently decreases toward the target idling speed.

An excessive increase in the engine speed is prevented in this manner, so that an excessive negative pressure is prevented from acting on the inside of the air intake pipe. After the start of the engine 10, the air intake pipe pressure lowers with increases in the engine speed. If, as in conventional control, the engine speed abruptly increases to a speed excessively higher than the idling speed, an excessive negative pressure will be exerted on the air intake pipe interior. This will result in an air/fuel mixture being temporarily enriched by accelerated gasification of the fuel sticking to an air intake port of the engine 10. However, when the arrival at the speed peak is followed by first a decrease in the engine speed and then an increase in air intake pipe pressure, a large portion of the fuel injected will stick to the air intake port to compensate for the quantity of fuel lost by gasification due to an increase in negative pressure. The air/fuel mixture will significantly be lean as a result. The lean state of the air/fuel mixture immediately after an engine start with a catalyst not warmed up will deteriorate exhaust gas emissions. To prevent this, the need will arise to add fuel during the start. When ignition timing retardation control is executed, however, since an excessive negative pressure is prevented from acting on the air intake pipe interior, the gasification of the fuel sticking to the air intake port is suppressed to prevent the air/fuel mixture from becoming lean if the speed peak is followed by an increase in the air intake pipe pressure. Adding fuel to prevent the occurrence of a lean state during engine start, therefore, becomes unnecessary when ignition timing retardation control is executed.

As described above, the controller according to the present embodiment makes it possible, by executing the ignition timing retardation control routine of FIG. 2, to reliably prevent not only the engine speed from abruptly increasing to an excessively high speed, but also increases in the engine speed from being excessively suppressed, independently of changes in rotational behavior. In addition, since the engine speed is prevented from abruptly increasing to an excessively high speed, changes in air/fuel ratio are suppressed and this, in turn, prevents exhaust gas emissions from deteriorating.

In the above-described embodiment, the ECU 2 executes the process of step 108, thus realizing the "speed peak detection" used in the present invention. Additionally, the ECU 2 executes the processes of steps 104 to 114, thus realizing the "speed increase suppression" used in the present invention. The processes in steps 104, 106, 112, and 114, in particular, are executed to implement the "ignition timing adjustment" in the present invention. The setting/resetting process for the flag in the routine of FIG. 2 is equivalent to the "prohibition" function implemented in the present invention. The process in step 102 is executed to implement the "operations/preparatory step detection" function in the present invention. Furthermore, the ECU 2 executes the process of step 110, thus realizing the "fuel properties identification" used in the present invention.

Second Embodiment

A second embodiment of the present invention is described below with reference to FIGS. 6 to 8.

Figure 6:
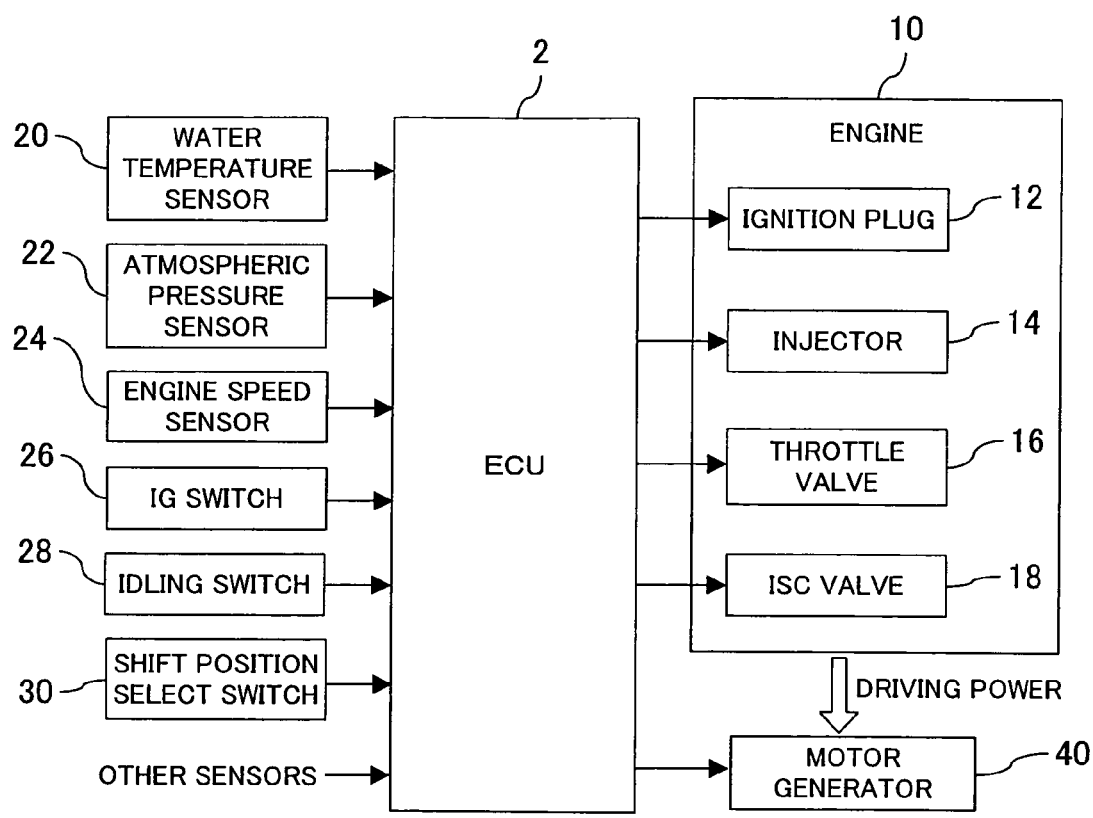
FIG. 6 is a diagram for explaining a configuration of the controller according to a second embodiment of the present invention.

FIG. 6 is a block diagram showing a configuration of an internal combustion engine controller according to the second embodiment of the present invention. In FIG. 6, sections common to those of the first embodiment described above are each assigned the same reference number, and descriptive overlaps concerning these sections are omitted herein.

The present embodiment assumes a hybrid vehicle (parallel type of hybrid vehicle) that has an internal combustion engine 10 and a motor generator (hereinafter, referred to simply as motor) 40 in parallel to generate driving power. The motor 40 functions as a motor by receiving the electric power supplied from a battery not shown, and functions as a generator by receiving the driving power supplied from the engine 10. The present embodiment activates the motor 40 as a generator when the engine 10 is started, and uses an ECU 2 to control a generator load and thus to suppress an abrupt increase in engine speed immediately after the start of the engine 10. That is to say, whereas the first embodiment indirectly controls an engine speed by controlling an engine output, the present (second) embodiment indirectly controls the engine speed by controlling the load acting on the engine 10.

Figure 7:
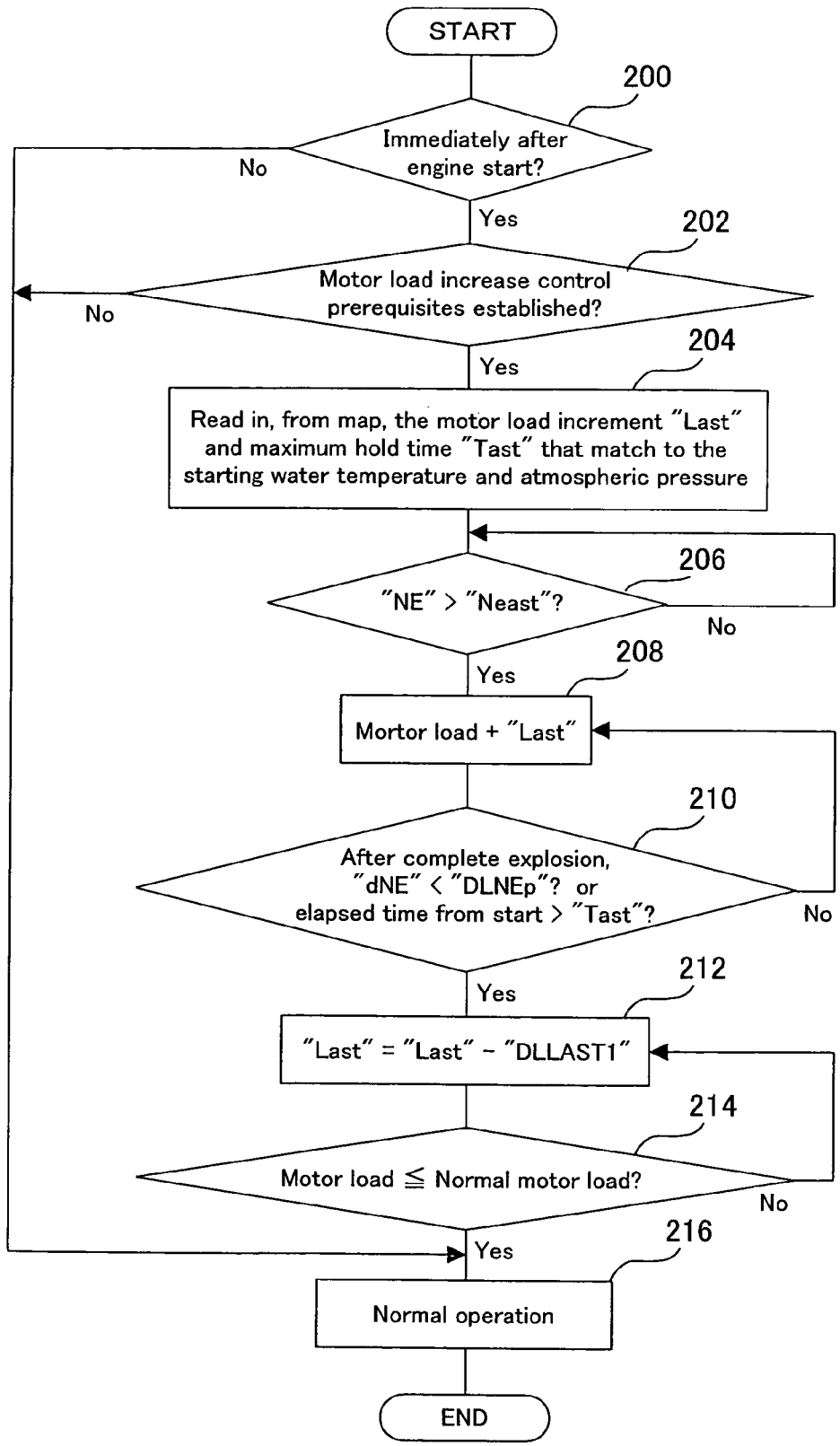
FIG. 7 is a flowchart of the motor load increase control routine executed in the second embodiment of the present invention.
Figure 8:
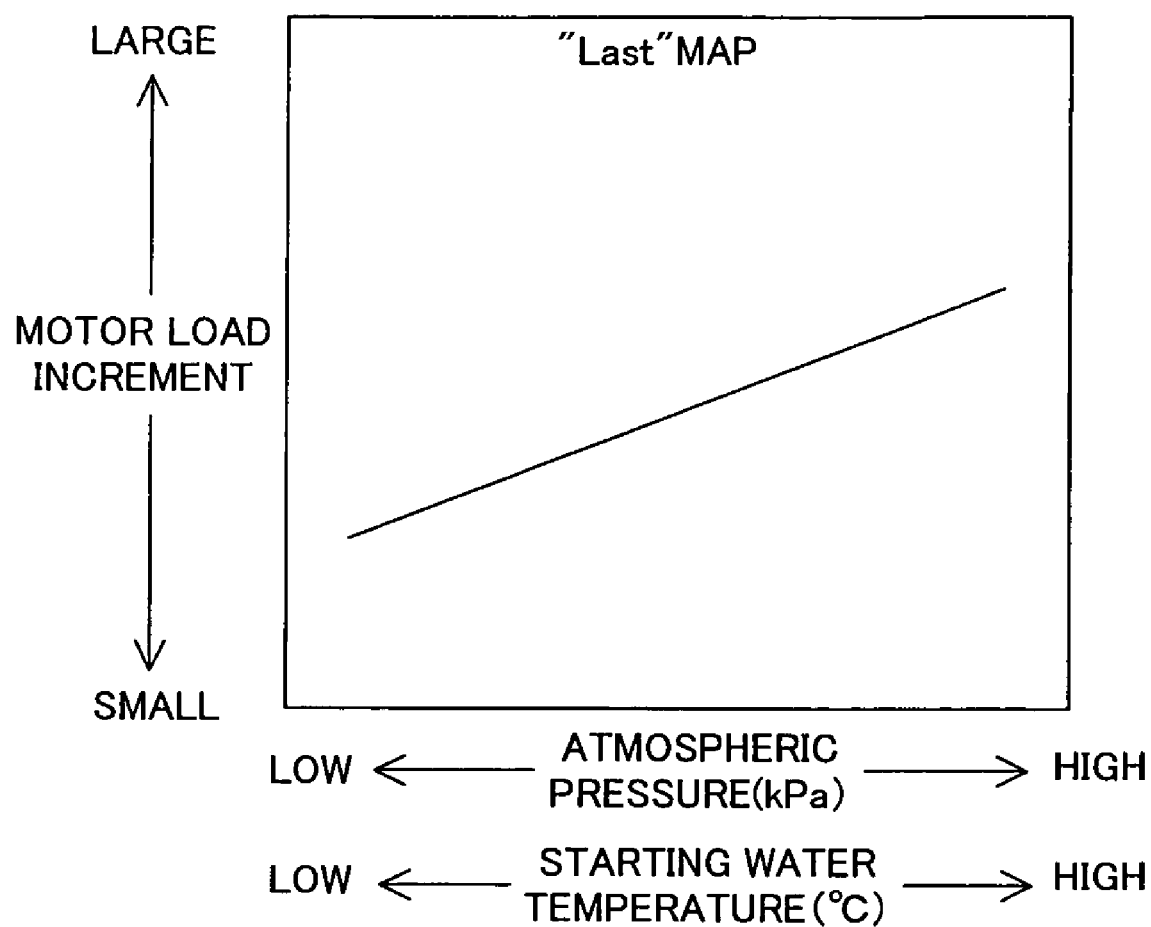
FIG. 8 is a map used for determining a motor load increment in the ignition timing retardation control routine.

FIG. 7 is a flowchart showing details of the speed increase suppression that the ECU 2 conducts in the present embodiment when the engine 10 is started. The speed increase suppression conducted in the present embodiment is outlined below. During an increasing period of the engine speed up to its arrival at a speed peak, a motor load is increased above a normal motor load, and once the engine speed peak has been reached or exceeded, the motor load is reduced to the normal motor load. Controlling, in this manner, increases in the motor load acting on the engine 10, yields an engine speed increase suppression effect similar to that achieved when the engine output is reduced by ignition timing retardation control. Hereinafter, the speed increase suppression conducted in the present embodiment is referred to specifically as motor load increase control.

More specifically, motor load increase control by the ECU 2 is conducted using the routine (load increase control routine) flowcharted in FIG. 7. First, whether the engine 10 has just been started is judged in step 200. This judgment is based on whether a motor load increase control prohibition flag is set to 1 or 0. After motor load increase control has been started, the flag is set to 1 when motor load increase control comes to an end. After this, the flag is reset to 0 when the engine 10 stops. When the flag is reset, the ECU 2 judges that the engine 10 has just been started.

If, in step 200, the engine 10 is judged not to have just been started, routine control proceeds to step 216, in which step the flag is then set to 1 and motor load increase control based on normal operation is conducted.

If, in step 200, the engine 10 is judged to have just been started, whether two prerequisites for executing motor load increase control are established is judged in step 202. Description of the prerequisites is omitted hereunder since their details are the same as the first and second prerequisites in step 102, involved with the ignition timing retardation control of the first embodiment.

If, in step 202, either prerequisite is judged not to have been established, routine control proceeds to step 216, in which step the flag is then set to 1 and motor load control based on normal operation is conducted.

If, in step 202, both prerequisites are judged to have been established, motor load increase control in step 204 onward is executed. First, a motor load increment "Last" is determined in step 204. The motor load increment "Last" is the amount of load added to a normal idling motor load (idling motor load) when the engine 10 is started. The motor load increment "Last" is defined for each of different starting water temperatures or atmospheric pressures, on such a map as shown in FIG. 8. The ECU 2 reads in, from the map, the motor load increment "Last" matching to the water temperature detected by a water temperature sensor 20 and to the atmospheric pressure detected by an atmospheric pressure sensor 22. The map shown in FIG. 8 indicates that the motor load increment "Last" is set to become smaller as the atmospheric pressure decreases. This allows for a relationship between air density and output. Decreases in output due to decreases in air density are compensated for by adjustment of the motor load. The map also indicates that the motor load increment "Last" is set to become smaller as the starting water temperature decreases. This allows for a friction loss of the engine 10. Decreases in the engine output due to cold-starting friction loss are compensated for by adjustment of the motor load.

Furthermore, in step 204, a maximum hold time "Tast" is also determined. The maximum hold time "Tast" defines a maximum time during which the motor load increment "Last" is to be continuously added to the normal motor load. The reason why the maximum hold time "Tast" is defined, and a method of determining "Tast" are not described herein since the reason and the method are the same as for the ignition timing retardation control in the first embodiment.

In next step 206, it is judged whether an engine speed "NE" is judged to be in excess of a required speed "NEast". This process is performed to prevent a stall of the engine 10 due to an increase in the motor load. The judgment in step 206 is repeated until the engine speed "NE" has exceeded the required speed "NEast".

If, in step 206, the engine speed "NE" is judged to have exceeded the required speed "NEast", sequence control proceeds to step 208, in which step the motor load increment "Last" that was determined in step 204 is then added to the motor load. Until a predetermined requirement has been judged to be established in next step 210, the motor load is held at the value obtained by adding the motor load increment "Last". Details of the judgment in next step 210 are the same as those of the judgment in next step 108, involved with the ignition timing retardation control in the first embodiment. More specifically, a predetermined requirement is established when a speed change rate "dNE" decreases below a threshold "DLNEp" or an elapsed time from engine start exceeds the maximum hold time "Tast". Since the motor load increment "last" is thus added to the motor load until the speed change rate "dNE" has decreased below the threshold "DLNEp", i.e., until the engine speed has reached a speed peak, the engine speed is prevented from abruptly increasing well above a target idling speed, without being affected by changes in rotational behavior.

If, as a result of the judgment in step 210, the speed change rate "dNE" has decreased below the threshold "DLNEp" or the elapsed time from engine start has exceeded the maximum hold time "Tast", the motor load is reduced to the normal motor load by execution of processes in next step 212 and in step 214. First, in step 212, the value obtained by subtracting a required amount of reduction, "DLLAST1", from the current motor load increment "Last" is set as a new motor load increment "Last". In step 214, it is judged whether the current motor load is below the normal motor load. The processes of steps 212 and 214 are repeated until the current motor load has been reduced below the normal motor load. Thus, the motor load is progressively attenuated to the normal motor load. Attenuating the motor load progressively to the normal motor load in this way makes it possible to prevent the engine speed from re-increasing, and hence to reduce the engine speed smoothly.

If, in step 214, the motor load is judged to have decreased below the normal motor load, sequence control proceeds to step 216, in which step the flag is then set to 1 and the above-described series of motor load increase control processes are completed. Setting of the flag to 1 is followed by motor load increase control based on normal operation. This prevents motor load increase control from being erroneously executed when the vehicle is subsequently started, and thus prevents hesitation during the start. After this, if the engine 10 comes to a stop due to an turn-off operation on an IG switch 26, an engine stall, idling stop control, or the like, the flag is reset to 0 and the above routine is executed once again for next engine start.

As described above, the controller according to the present embodiment makes it possible, by executing the motor load increase control routine of FIG. 7, to reliably prevent not only the engine speed from abruptly increasing to an excessively high speed, but also increases in the engine speed from being excessively suppressed, independently of changes in rotational behavior. In addition, similarly to the ignition timing retardation control in the first embodiment, since the engine speed is prevented from abruptly increasing to an excessively high speed, changes in air/fuel ratio can be suppressed and exhaust gas emissions can thus be prevented from deteriorating. Furthermore, the controller according to the present embodiment also has an advantage that the energy that has been used for unnecessary increasing of the engine speed by means of conventional control can be regenerated as electric power.

In the above-described embodiment, the ECU 2 executes the process of step 210, thus realizing the "speed peak detection" used in the present invention. Additionally, the ECU 2 executes the processes of steps 204 to 214, thus realizing the "speed increase suppression" used in the present invention. The setting/resetting process for the flag in the routine of FIG. 7 is equivalent to the "prohibition" function implemented in the present invention. The process in step 202 is executed to implement the "operations/preparatory step detection" function in the present invention.

Others

While embodiments of the present invention have been described above, the invention is not limited to the above embodiments and various modifications may be introduced to embody the invention without departing from the scope thereof. For example, the following modifications may be made to embody the invention:

Although, in the first embodiment, ignition timing is adjusted as a method of controlling the engine speed, any other control parameter such as a fuel injection rate may be adjusted instead, only if the control parameter relates to the engine output. Use of an air intake rate, however, makes it necessary to throttle down the valve angle of the ISC valve 18 to suppress the engine output, and for this reason, increases the internal negative pressure of the air intake pipe. Increasing the internal negative pressure of the air intake pipe is not preferable since an over-lean state of the air/fuel mixture subsequently results. To use a control parameter other than ignition timing, therefore, it is desirable that a control parameter different from an air intake volume should be used.

In addition, although, in the second embodiment, the motor load of the motor 40 is adjusted assuming a hybrid vehicle, the load applied to any other device may be adjusted instead, only if the load is that of the device driven by the engine 10. For example, an alternator load or an air conditioner load may be adjusted instead.

The major benefits of the present invention described above are summarized follows:

According to a first aspect of the present invention, an abrupt increase in the engine speed immediately after the engine has been started is suppressed since a control parameter relating to the engine output is set to be a value at which the engine output decreases than at an idling value. Speed increase suppression by control parameter setting for reduced output of the engine is continued until a speed peak thereof has been detected. Thus, the engine speed is reliably prevented from abruptly increasing to an excessively high speed, without being affected by changes in rotational behavior. After detection of the speed peak, since the control parameter is adjusted to the idling value, increases in the speed are also prevented from being excessively suppressed. In addition, adjustment of the intake air flow rate results in the internal negative pressure of the air intake pipe being increased by intake air flow restriction for reduced output of the engine. Since a control parameter different from the intake air flow rate is subjected to adjustment in the present invention, however, the internal negative pressure of the air intake pipe is not increased by the adjustment of the control parameter.

According to a second aspect of the present invention, an abrupt increase in the engine speed immediately after the engine has been started is suppressed since the load on the equipment driven by the engine is increased above an idling load. Speed increase suppression by the increase in the load is continued until the peak of the engine speed has been detected. Thus, the engine speed is reliably prevented from abruptly increasing to an excessively high speed, without being affected by changes in rotational behavior. After detection of the speed peak, since the load is adjusted to the idling load, increases in the speed are also prevented from being excessively suppressed.

According to a third aspect of the present invention, reliably detection of a speed peak, not affected by changes in rotational behavior, is possible since the change rate of the engine speed is used for speed peak detection.

According to a fourth aspect of the present invention, since ignition timing is excellent in output control response characteristics, when the ignition timing is adjusted as the control parameter, the engine output is adjusted appropriately and thus the engine speed is reliably prevented from abruptly increasing to an excessively high speed.

According to a fifth aspect of the present invention, when the fuel is heavy in terms of properties, stall of the engine due to the insufficiency of output is avoided since the advance rate of the ignition timing after the speed peak has been detected is augmented. Since the fuel properties affect increases in after-starting engine speed, the fuel properties can also be accurately identified by the engine speed achieved when the speed peak is detected.

According to a sixth aspect of the present invention, as the air pressure decreases, the starting ignition timing is advanced more significantly. Thus, although at high-altitude locations, for example, even if air density is low and the air volume inside a cylinder remains the same, the engine output decreases below that achieved at flat locations, stall of the engine due to the insufficiency of the output is avoided in the present invention since the engine output is adjustable by setting the starting ignition timing properly.

According to a seventh aspect of the present invention, after detection of the speed peak, changes in speed due to abrupt changes in the engine output are prevented since ignition timing is gradually advanced to idling ignition timing. In particular when the ignition timing is advanced at a rate lower than a critical advance rate not causing the engine to knock, the ignition timing can be advanced according to the particular increase in air intake pipe pressure, whereby a combustion state is stabilized to prevent the deterioration of exhaust gas emissions.

According to an eighth aspect of the present invention, when speed increase suppression is executed and then comes to an end, further execution thereof is prohibited and this prevents the occurrence of hesitation due to the execution of speed increase suppression during the vehicle start following the engine start. In addition, since the prohibited state released by the stop of the engine, speed increase suppression is re-executed during engine restart and the engine speed is reliably prevented from abruptly increasing to an excessively high speed immediately after the restart.

According to a ninth aspect of the present invention, when operation of the engine by a driver or the preparatory step taken by the driver for the operation of the engine is detected, the occurrence of a feeling of uneasiness due to the suppression of speed increases against the driver's will is prevented since the execution of speed increase suppression is prohibited. In addition, when a complete explosion in the engine is followed by the start of detection of deriver's operation or preparatory step, it is possible to prevent speed increase suppression from being canceled by operation or preparatory step not based on the driver's intent of starting the vehicle or of racing the engine.

The invention claimed is:

1. An internal combustion engine controller, comprising:
   a unit for detecting a peak of an engine speed after start of the engine; and
   a unit for suppressing an increase in engine speed by adjusting a control parameter different from an air intake rate relating to an engine output;
   wherein, from the start of the engine to detection of the speed peak by said speed peak detection unit, said speed increase suppression unit sets the control parameter to a value at which the engine output decreases than at an idling value, and after the detection of the speed peak, adjusts the control parameter to the idling value.

2. An internal combustion engine controller, comprising:
   a unit for detecting a peak of an engine speed after start of the engine; and
   a unit for suppressing an increase in engine speed by adjusting a load of equipment driven by the engine;
   wherein, from the start of the engine to detection of the speed peak by said speed peak detection unit, said speed increase suppression unit increases the load of the equipment to a value greater than an idling load, and after the detection of the speed peak, adjusts the load of the equipment to the idling load.

3. The controller according to claim 1, wherein said speed peak detection unit judges that when a change rate of the engine speed is reduced below a required value, the speed peak has been reached.

4. The controller according to claim 1, wherein:
   said speed increase suppression unit includes, as means for adjusting a control parameter relating to the engine output, ignition timing adjustment unit for adjusting ignition timing of the engine; and
   from the start of the engine to detection of the speed peak, said ignition timing adjustment unit holds ignition timing at the starting ignition timing set to be retarded with respect to idling ignition timing, and after the detection of the speed peak, advances the ignition timing from the starting ignition timing to the idling ignition timing.

5. The controller according to claim 4, wherein:
   said speed increase suppression unit further includes fuel property identification unit for identifying properties of the fuel supplied from the engine; and
   if the fuel properties identified by said fuel property identification unit indicate that the fuel is a heavy fuel, said ignition timing adjustment unit sets an advance rate of the ignition timing existing after the detection of the speed peak, to a value larger than if the fuel is identified as a light fuel.

6. The controller according to claim 5, wherein said fuel property identification unit identifies the fuel properties from the engine speed existing when the speed peak is detected.

7. The controller according to claim 4, wherein:
   said speed increase suppression unit further includes atmospheric pressure identification unit for detecting or estimating an atmospheric pressure; and
   said ignition timing adjustment unit sets the starting ignition timing such that as the atmospheric pressure identified by said atmospheric pressure identification unit decreases, the starting ignition timing advances more significantly.

8. The controller according to claim 4, wherein, after the detection of the speed peak, said ignition timing adjustment unit progressively advances ignition timing to the idling ignition timing.

9. The controller according to claim 8, wherein said ignition timing adjustment unit advances ignition timing to the idling ignition timing at an advance rate lower than a critical advance rate not causing the engine to knock.

10. The controller according to claim 1, further comprising:
    a unit for prohibiting execution of speed increase suppression by said speed increase suppression unit;
    wherein, when the speed increase suppression is executed and comes to an end, said prohibition unit prohibits further execution of the speed increase suppression, and when the engine stops, said prohibition unit releases the prohibition.

11. The controller according to claim 10, further comprising:
    a unit for detecting, after the start of the engine, operation of the engine by a driver or a preparatory step for operation of the engine taken by the driver;
    wherein said prohibition unit prohibits the execution of the speed increase suppression when the operation or preparatory step by the driver is detected by said operations/preparatory step detection unit.

12. The controller according to claim 11, wherein said operations/preparatory step detection unit starts detecting the operations or preparatory steps of the driver when a complete explosion in the engine is occurred.

13. The controller according to claim 2, wherein said speed peak detection unit judges that when a change rate of the engine speed is reduced below a required value, the speed peak has been reached.

14. The controller according to claim 2, further comprising:
    a unit for prohibiting execution of speed increase suppression by said speed increase suppression unit;
    wherein, when the speed increase suppression is executed and comes to an end, said prohibition unit prohibits further execution of the speed increase suppression, and when the engine stops, said prohibition unit releases the prohibition.

15. The controller according to claim 14, further comprising:
    a unit for detecting, after the start of the engine, operation of the engine by a driver or a preparatory step for operation of the engine taken by the driver;
    wherein said prohibition unit prohibits the execution of the speed increase suppression when the operation or preparatory step by the driver is detected by said operations/preparatory step detection unit.

16. The controller according to claim 15, wherein said operations/preparatory step detection unit starts detecting the operations or preparatory steps of the driver when a complete explosion in the engine is occurred.

* * * * *